Aug. 24, 1937.　　F. A. DEUTSCH　　2,090,751
HYDRAULIC SHOCK ABSORBER
Filed April 6, 1935
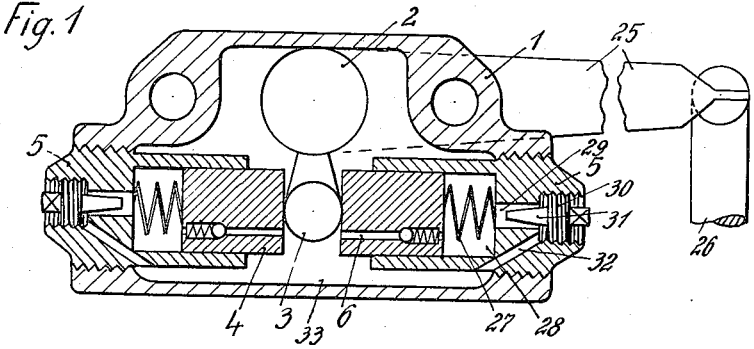
Fig. 1
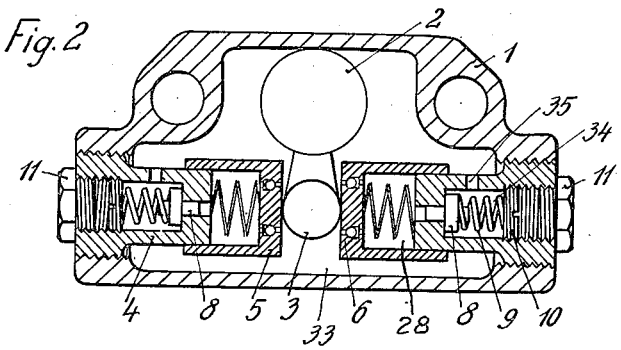
Fig. 2
Fig. 3
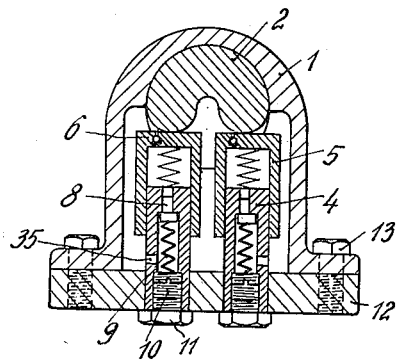
Fig. 4
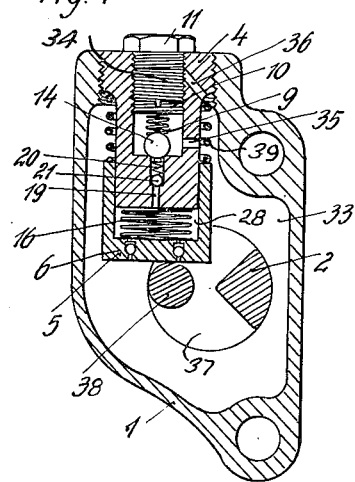
Inventor:
Fritz Albert DEUTSCH
by [signature]
his Attorney.

Patented Aug. 24, 1937

2,090,751

UNITED STATES PATENT OFFICE 2,090,751

HYDRAULIC SHOCK ABSORBER

Fritz Albert Deutsch, Berlin, Germany, assignor to Francisco Liebhold, Brussels, Belgium Application April 6, 1935, Serial No. 15,001
In Germany June 30, 1934

9 Claims. (Cl. 267—8)

By means of the present invention it is intended to create a hydraulic shock absorber which, in conjunction with absolute reliable action, is of the greatest possible simplicity of construction permitting, for that reason, not only during the manufacturing process but also in case of possible repairs, an easy assemblying or interchangeability of the hydraulically stressed parts.

A characteristic feature of the present invention consists in so designing piston and cylinder, including the hydraulic part, i. e. the re-fill, regulation devices etc. as to form a retarder unit, ready for work in itself, being independent of the casing, as well as of the shaft end of the actuating elements connected with the shaft and causing the relative movement of piston and cylinder, said retarder unit possessing, for instance, the shape of a cartridge and permitting to be placed as a whole into the casing, designed as re-fill chamber, or to be withdrawn therefrom, without difficulty and without loss of time, when assembling the hydraulic shock absorber or in case of repairs that may prove necessary, without touching, in connection herewith, the shaft or the actuating elements, such as cams or the like. This embodies the advantage that the working space between piston and cylinder is completely surrounded by the re-fill chamber. In consequence thereof, it has been rendered possible to dispose the regulating means, for instance, over-pressure valves, within the fixed part of the cartridge-shaped unit, be it piston or cylinder and to allow the working fluid, forced out of the working space, to flow back directly into the re-fill chamber, and to dispense with long circulating channels.

A further advantage of the new arrangement consists therein, that in case of leakiness of the cylinder wall the working fluid is prevented from penetrating into the open and caused to immediately flow back into the re-fill chamber, so as to obviate the loss of oil.

In the new arrangement, however, it will, generally speaking, be quite impossible, that such leakiness presents itself. In view of the fact, that all parts of the shock absorber being stressed by fluid pressure, represent constructional parts independent of the casing, it will be possible to manufacture these parts from a specially high-grade material which, even in connection with high pressure stresses, is absolutely fluid-proof. On the other hand, the capacity of resistance against external influences, as for instance, thrown stones, do not require to be drawn into consideration, because these parts, being housed within the casing, are protected from external damages. In many cases it may be of particular advantage to so design the arrangement, that the cartridge-shaped unit stands upright with its longitudinal axis and is deposited into the casing at the top side. An arrangement of this nature will permit the shock absorber being withdrawn without the fluid running out of the casing. Moreover, in this case the arrangement may be so designed, that the working fluid may be introduced without the necessity of withdrawing the cartridge-shaped unit.

A few modifications of the present invention have been represented in the attached drawing in longitudinal section.

Fig. 1 shows a shock absorber with screwed-in cylinder casing, whereas Fig. 2 represents a shock absorber with screwed-in piston part.

Fig. 3 illustrates a shock absorber with two pistons positioned parallelly to each other, in which the hydraulic part is flanged on to the bottom of the casing.

Fig. 4 details a form of device, in which the hydraulic aggregate, with its longitudinal axis in an upright position, may be deposited into the casing from above.

In all four examples of performance a shock absorber casing 1 has been provided permitting to be attached to the frame of the vehicle body. The casing 1 is made to contain the shock absorber shaft 2. Outside the casing 1 this shaft 2 firmly supports a lever 25 being pivotally connected with a link 26. The lower end of the link 26 is connected with the wheel axle, so that mutual motions between the axle and the frame will cause a rotation of the shaft 2. With the shaft 2 the tappet 3 is firmly connected within the shock absorber casing. The hydraulic braking effect of the rocking motion of this tappet 3 is now brought about with the aid of cartridge-shaped units which have been inserted in the casing 1, representing, however, in themselves units which are perfectly independent of the casing. In the Figs. 1, 2 and 3 the motion of the tappet 3 or of the shaft 2, are to be dampened in both directions and for this reason two cartridge-shaped retarder units have been incorporated in each of these three modifications.

Each of these retarder units consists in Fig. 1 of a part 5 forming the cylinder. This cylinder serves for the reception of a piston 4 being kept in contact with the tappet 3 by means of the spring 27. The charging of the working space 28 is effected with the aid of the channel 6, closed by a non-return valve, provided in the piston 4. The regulating devices for the effectiveness of the shock absorber are suitably provided in the fixed cylinder part 5 and consist of a bore 29 which may be closed by means of a nut 30 adapted to be adjusted. The nut 30 is made to support a tapering pin 31 projecting into the bore 29. According to the position of the nut 30, the pin 31 will furnish a more or less large throttling cross section through which the fluid is passing, being displaced from the working space 28 via the channel 32, subsequently flowing back through the channel 32 into the re-fill chamber 33.

It will be obvious without any difficulty that the mode of action of the shock absorber may be effected from outside by setting the nut 30 even whilst the shock absorber is in operation.

It will be plain that, by screwing out the cylinder part 5 the entire hydraulic retarder unit may be axially withdrawn from the casing. This retarder unit possesses a shape which may be compared to that of a cartridge. The great facility with which this cartridge may be placed in its working position, renders possible an easy assembling of the shock absorber and also facilitates repairs.

The modification shown in Fig. 2 differs from that represented in Fig. 1 by the fact, that the cylinder 5 is movably positioned, whilst the piston part 4 is fixed being screwed into the casing 1 for the purpose of connecting the cartridge with the latter. In this form of performance, the re-fill openings 6 are, correspondingly, provided in the cylinder, whilst the regulalting means for the degee of the damping have been provided in the fixed piston part 4. These regulating means consist in Fig. 2 of an over-pressure valve 8 subjected to the action of a regulating spring 9. The preliminary tension of the regulating spring 9 may be varied by means of turning the threaded screw 10 clockwise or anti-clockwise, thus regulating the dampening effect of the shock absorber within wide limits. The closing screw 11 secures the regulating bore against loss of fluid. The fluid forced from the working space 28 via the valve 8 can flow back into the re-fill chamber 33 through the hollow space 34 in the piston part 4 and the bore 35.

Fig. 3 shows another embodiment of a shock absorber. There are no special cams or tappets secured to the shaft 2. The means actuating the cylinders, however, are produced by milling out the shaft material, so that suitable cam surfaces within the confines of the shaft are formed. The construction of the two cartridge-shaped, hydraulic working devices essentially correspond to those described in Fig. 2. In Fig. 3 the casing 1 is closed by means of a plate 12, in which the piston parts 4 have been firmly mounted. The plate 12 may be flanged on to the shock absorber casing 1 proper by means of screws 13. By detaching the plate 12 the two hydraulic aggregates can thus be simultaneously withdrawn from the casing 1. There will, however, be no difficulty whatsoever also in this form of performance to render the pistons 4 adaptable for being screwed into the plate 12 in the same way as it has been described with reference to Fig. 2, so that the two hydraulic aggregates may also be replaced individually.

From the description it can be gathered that in all forms of performance the cartridges formed by the hydraulic aggregate are situated within the casing designed as re-fill chamber. For this reason, the cartridges may be made from a high-grade fluid-proof material, without having to pay any special attention to their possessing any particular capacity of resistance against external influences, such as thrown stones, being protected from such influences through the medium of the casing. The casing may be made to consist, in the usual manner, of cast iron, malleable iron or of cast steel. It may, however, also be made from light metal. It is a matter of course, that the shock absorber shaft may be supported in special brasses or bushings of the casing 1.

The inventive idea can, naturally be incorporated in any kind of hydraulic shock absorbers and similar devices. If there are several working chambers existing, it is immaterial whether they are placed to each other at an angle of 180°, at an acute or obtuse angle or whether they are parallel to each other.

It is self-evident, that the present invention can, apart from hydraulic shock absorbers, also be applied to such hydraulic devices being simultaneously intended for shock absorption or exclusively for the stabilization of motor vehicles.

The form of performance represented in Fig. 4 is intended to serve as an example, that it is also possible to deposit the cartridge in accordance with the present invention vertically from above into the casing. Apart from the advantages previously mentioned, this arrangement possesses the advantage that when withdrawing or interchanging the cartridge, the fluid cannot run out of the casing 1. Also the re-charging or re-filling of working fluid into the casing 1 is very simple and may be effected without the necessity of withdrawing the cartridge. For this purpose it will be sufficient, to provide below the nut 11, closing up the hollow chamber 34 in the piston part 4 from the outside, a short, oblique bore 36 communicating with the upper part of the inner space or chamber of the casing 1. If, after the removal of the closing nut 11, oil is introduced into the opening 34, it will flow through the bore 36 into the re-fill chamber 33. Differing from the previously described embodiments illustrated in Figs. 1 to 3 the shock absorber as shown in Fig. 4 has a shaft 2 provided with a recess 37 which receives the pin 38 contacting with the cylinder 5. The design of the cartridge, however, closely resembles that described with reference to Fig. 2 and for this reason and as far as conformity is present, the identical marks of reference have been employed. In order to press the cylinder 5 against the pin 38, return springs 16 and 39 are provided, one of which may be omitted. If the retarder unit is either inserted into or withdrawn from the casing 1, the springs 16 and 39 will not separate the piston 4 and the cylinder 5 from each other, as the lengths of the unloaded springs are of such small length, that the springs can not drive off the cylinder from the piston. Furthermore, the piston is tightly fitted in the cylinder and the working chamber 28 is filled with liquid, so that the cylinder holds to the piston and can not fall down from the latter during an insertion or a removal of the retarder unit.

The embodiment illustrated in Fig. 4 shows another important feature, which may also be employed in combination with the above described embodiments or other embodiments of shock absorbers. As it is well known, the automatic regulating valve 14 operates in such a way, that it opens and closes in very short intervals, as during the run of the vehicle the cylinder 5 almost continuously moves upwards and downwards due to the unevenness of the road. It is possible that these opening and closing movements, quickly succeeding each other produce very disturbing and undesired noises resulting from the impact of the ball 14 upon its seat. Such noises will be eliminated by the arrangement of the ball 21, which is positioned with but little clearance in the channel 20 leading to the automatic valve 14, thus causing a certain throttling of the passing liquid. Said throttling results in a certain retarding of the closing movements of the valve 14 under the action of the spring 9, so that the noises due to the operation of the valve 14 are considerably moderated or even eliminated by the additional throttling means 21. It may be observed that the lengths of the cylinder oscillations vary according to the degree of the unevenness of the road, and the cylinder will be at the maximum of its upward stroke only for a limited number of strokes during the great number of its almost constant quick movements of more or less length. Whether the ball 21 comes in contact with the ball 14 or not depends upon the degree of the cylinder stroke, but whatever the relative position of the two balls will be, on reversal of the cylinder stroke the small clearance between the ball 21 and the wall of the channel 20 causes a throttling of the fluid, so that the spring 9 has to overcome the resistance of the fluid against the displacement of the ball 14 and can not immediately return the ball 14 to its seat. Thus, the dampening action of the ball 21 is obtained, and the movement of the ball 14 is retarded, so that the disturbing noises are eliminated.

What I claim, is:

1. In a fluid shock absorber, the combination of a casing forming a refilling chamber and having an opening in its wall, an actuating shaft extending into said casing and provided with oscillatable operating means, and a retarder unit adapted to be substantially completely housed within said casing and in the form of a cartridge axially insertable into and removable from the casing through said opening and comprising relatively movable piston and cylinder members forming therebetween a working chamber and a spring arranged between said members, one of said members being held in said opening in a concentrical arrangement with respect to said opening, each of said members having a diameter less than the diameter of the opening, regulating means to control the escape of the working fluid from the working chamber into the refilling chamber arranged in the stationary member held in said opening, an automatic refilling valve disposed in the movable member, the inner end of said movable member being adapted to have an operative abutting contact with said operating means whereby the insertion and removal of said unit may be effected freely and independently of the other parts of the shock absorber.

2. In a fluid shock absorber, the combination of a casing forming a refilling chamber and having an opening in its wall, an actuating shaft extending into said casing and provided with oscillatable operating means, and a retarder unit adapted to be substantially completely housed within said casing and in the form of a cartridge axially insertable into and removable from the casing through said opening and comprising relatively movable piston and cylinder members forming therebetween a working chamber and a spring arranged between said members, said cylinder member having a diameter less than said opening being held in the opening in a concentrical arrangement with respect to the opening, regulating means to control the escape of the working fluid from the working chamber into the refilling chamber arranged in said stationary cylinder member held in said opening, an automatic refilling valve disposed in the movable piston member, the inner end of said piston member being adapted to have an operative abutting contact with said operating means whereby the insertion and removal of said unit may be effected freely and independently of the other parts of the shock absorber.

3. In a fluid shock absorber, the combination of a casing forming a refilling chamber and having an opening in its wall, an actuating shaft extending into said casing and provided with oscillatable operating means, and a retarder unit adapted to be substantially completely housed within said casing and in the form of a cartridge axially insertible into and removable from the casing through said opening and comprising relatively movable piston and cylinder members forming therebetween a working chamber and a spring arranged between said members, said piston member having a diameter less than the diameter of said opening being held in said opening in a concentrical arrangement with respect to said opening, regulating means to control the escape of the working fluid from the working chamber into the refilling chamber arranged in said stationary piston member held in said opening, an automatic refilling valve disposed in the movable cylinder member, the inner end of said cylinder member being adapted to have an operative abutting contact with said operating means whereby the insertion and removal of said unit may be effected freely and independently of the other parts of the shock absorber.

4. In a fluid shock absorber, the combination of a casing forming a refilling chamber and having an opening in its wall, an abutting shaft extending into said casing and provided with oscillatable operating means, and a retarder unit adapted to be substantially completely housed within said casing and in the form of a cartridge axially insertable into and removable from the casing through said opening and comprising relatively movable piston and cylinder members forming therebetween a working chamber and a spring arranged between said members, one of said members being held in said opening in a concentrical arrangement with respect to said opening, regulating means to control the escape of the working fluid from the working chamber into the refilling chamber arranged in the stationary member held in said opening and additional throttling means in said stationary member to retard the movement of said regulating means, an automatic refilling valve disposed in the movable member, the inner end of said movable member being adapted to have an operative abutting contact with said operating means whereby the insertion and removal of said unit may be effected freely and independently of the other parts of the shock absorber.

5. In a fluid shock absorber, the combination of a casing forming a refilling chamber, an actuating shaft extending into said casing and provided with oscillatable operating means, a dampening mechanism arranged in said casing and provided with a movable dampening member contacting with said operating means, an automatic refilling valve disposed in said dampening mechanism, a regulating valve in said dampening mechanism to control the dampening effect of said dampening member, a spring urging the valve against its seat and additional throttling means in said dampening mechanism to retard the closing movement of said spring pressed regulating valve against its seat.

6. In a fluid shock absorber, the combination of a casing forming a refilling chamber and having an aperture in its wall, a plate covering said aperture and being attached to said casing, said plate being provided with at least one opening, an actuating shaft extending into said casing and provided with oscillatable operating means, and at least one retarder unit adapted to be substantially completely housed within said casing and in the form of a cartridge axially insertible into and removable from the casing through said opening of the plate and comprising relatively movable piston and cylinder members forming therebetween a working chamber and a spring arranged between said members, one of said members being held in said opening in a concentrical arrangement with respect to said opening, regulating means to control the escape of the working fluid from the working chamber into the refilling chamber arranged in the stationary member held in said opening, an automatic refilling valve disposed in the movable member, the inner end of said movable member being adapted to have an operative abutting contact with said operating means whereby the insertion and removal of said unit may be effected freely and independently of the other parts of the shock absorber.

7. In a fluid shock absorber, the combination of a casing forming a refilling chamber and having an aperture in its wall, a plate covering said aperture and being attached to said casing, said plate being provided with at least one opening, an actuating shaft extending into said casing and provided with oscillatable operating means, and at least one retarder unit adapted to be substantially completely housed within said casing and in the form of a cartridge axially insertable into and removable from the casing through said opening of the plate and comprising relatively movable piston and cylinder members forming therebetween a working chamber and a spring arranged between said members, one of said members being held in said opening in a concentrical arrangement with respect to said opening, the inner end of the other member being adapted to have an operative abutting contact with said operating means whereby the insertion and removal of said unit may be effected freely and independently of the other parts of the shock absorber.

8. In a fluid shock absorber, the combination of a casing forming a refilling chamber and having an opening in its wall, a plate covering said opening and being detachably secured to said casing, an actuating shaft extending into said casing and provided with oscillatable means, and at least one retarder unit adapted to be substantially completely housed within said casing and in the form of a cartridge insertable and removable as a whole from the casing through said opening and comprising relatively movable piston and cylinder members forming therebetween a working chamber and a spring arranged between said members, one of said members being attached to said plate, the inner end of the other member being adapted to have an operative abutting contact with said operating means whereby the insertion and removal of said unit may be effected freely and independently of the other parts of the shock absorber.

9. In a fluid shock absorber, the combination of a casing forming a refilling chamber and having a plurality of openings in its wall, an actuating shaft extending into said casing and provided with oscillatable operating means, and a plurality of retarder units adapted to be substantially completely housed within said casing and each unit in the form of a cartridge axially insertible into and removable from the casing through said openings and comprising relatively movable piston and cylinder members forming therebetween a working chamber and a spring arranged between said members, one of said members of each unit being held in one of said openings in a concentrical arrangement with respect to said openings, each of said members of each unit having a diameter less than the diameter of said opening, regulating means to control the escape of the working fluid from the working chamber into the refilling chamber arranged in each unit in the stationary member held in said opening, an automatic refilling valve disposed in the movable member of each unit, the inner ends of the movable members of each unit being adapted to have an operative abutting contact with said operating means, whereby the insertion and removal of said units may be effected freely and independently of the other parts of the shock absorber.

FRITZ ALBERT DEUTSCH.